(12) United States Patent
Fedyk et al.

(10) Patent No.: US 10,812,393 B2
(45) Date of Patent: Oct. 20, 2020

(54) PACKET DISTRIBUTION BASED ON AN IDENTIFIED SERVICE FUNCTION

(71) Applicant: HEWLETT PACKARD ENTERPRISE DEVELOPMENT LP, Houston, TX (US)

(72) Inventors: Don Fedyk, Andover, MA (US); Paul Allen Bottorff, Roseville, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 73 days.

(21) Appl. No.: 16/066,935

(22) PCT Filed: Dec. 28, 2015

(86) PCT No.: PCT/US2015/067691
§ 371 (c)(1),
(2) Date: Jun. 28, 2018

(87) PCT Pub. No.: WO2017/116399
PCT Pub. Date: Jul. 6, 2017

(65) Prior Publication Data
US 2019/0007321 A1    Jan. 3, 2019

(51) Int. Cl.
*H04L 12/803*   (2013.01)
*H04L 29/08*    (2006.01)
(Continued)

(52) U.S. Cl.
CPC ........ *H04L 47/125* (2013.01); *H04L 41/5041* (2013.01); *H04L 45/24* (2013.01); *H04L 45/306* (2013.01); *H04L 45/74* (2013.01); *H04L 61/25* (2013.01); *H04L 61/6022* (2013.01); *H04L 67/1004* (2013.01); *H04L 69/22* (2013.01)

(58) Field of Classification Search
CPC ... H04L 47/125; H04L 41/5041; H04L 45/24; H04L 45/306; H04L 45/74; H04L 61/25; H04L 61/6022; H04L 67/1004; H04L 69/22
See application file for complete search history.

(56) References Cited

U.S. PATENT DOCUMENTS

| 2003/0108052 A1 | 6/2003 | Inoue et al. |
| 2011/0055845 A1 | 3/2011 | Nandagopal et al. |

(Continued)

FOREIGN PATENT DOCUMENTS

| JP | 2012-175351 A | 9/2012 |
| JP | 2014-068258 A | 4/2014 |
| KR | 10-2013-0126770 A | 11/2013 |

OTHER PUBLICATIONS

"Enabling Service Function Chains and Value-added Services with Sandvine Divert," Nov. 3, 2014, pp. 1-16, Sandvine.

(Continued)

*Primary Examiner* — Walter J Divito
*Assistant Examiner* — Anthony Luo
(74) *Attorney, Agent, or Firm* — Hewlett Packard Enterprise Patent Department

(57) ABSTRACT

Some examples herein disclose a load balancer to identify a service function among multiple service functions based on an available capacity. The load balancer modifies a switch address in the packet and distributes the packet to the identified service function based on the modified switch address.

20 Claims, 7 Drawing Sheets

(51) Int. Cl.
*H04L 29/12* (2006.01)
*H04L 12/24* (2006.01)
*H04L 12/725* (2013.01)
*H04L 12/741* (2013.01)
*H04L 12/707* (2013.01)
*H04L 29/06* (2006.01)

(56) References Cited

U.S. PATENT DOCUMENTS

| | | |
|---|---|---|
| 2011/0314180 A1 | 12/2011 | Naseh |
| 2013/0163594 A1 | 6/2013 | Sharma et al. |
| 2013/0272305 A1 | 10/2013 | Lefebvre et al. |
| 2014/0310390 A1 | 10/2014 | Sorenson, III et al. |
| 2014/0341029 A1 | 11/2014 | Allan et al. |
| 2015/0139230 A1 | 5/2015 | Zha et al. |
| 2015/0304450 A1 | 10/2015 | van Bemmel |
| 2015/0358236 A1 | 12/2015 | Roach et al. |
| 2015/0365328 A1* | 12/2015 | Luke .................. H04L 47/125 370/238 |
| 2016/0344803 A1* | 11/2016 | Batz .................. H04L 12/1407 |
| 2017/0288909 A1* | 10/2017 | Bottorff ............. H04L 12/6418 |

OTHER PUBLICATIONS

Bruno Rijsman, "Service Chain Load Balancing with Opencontrail," May 2, 2014, pp. 1-10, OpenContrail.

International Search Report & Written Opinion received in PCT Application No. PCT/US2015/067691, dated Aug. 24, 2016, 13 pages.

Cisco; "Internet Engineering Task Force (IETF) Service Function Chaining (SFC) Architecture", Oct. 31, 2015 pp. 1-32 (online), Retrieved from the Internet on Aug. 14, 2018: URL<rfc-editor.org/rfc/pdfrfc/ rfc7685.txt.pdf >.

Poddar Rishabh et al: "HAVEN: Holistic load balancing and auto scaling in the cloud", 2815 7th International Conference on Communication Systems and Networks Jan. 6, 2015, pp. 1-8 (online) Retrieved from the Internet on Aug. 14, 2018 URL <rishabhpoddar.com/publications/Haven.pdf>.

Mackie et al., "Service Function Chains Using Virtual Networking", SFC Using Virtual Networking, Oct. 17, 2014, 44 pages.

Blendin et al., "Position Paper: Software-Defined Network Service Chaining", 2014 Third European Workshop on Software-Defined Networks, 2014, pp. 109-114.

* cited by examiner

238

| | 240 | 242 | 244 | 246 |
|---|---|---|---|---|
| | vPort1 | DA1 | DA1' | vPort1' |
| | | | DA1'' | vPort1'' |
| | | | DA1''' | vPort1''' |

| 250 | 252 | 254 | 256 | 258 |
|---|---|---|---|---|
| vPort1 | ChainSegDA1 | ChainSegDA1' | ChainSegSA1' | vPort1' |
| | | ChainSegDA1'' | ChainSegSA1'' | vPort1'' |
| | | ChainSegDA1''' | ChainSegSA1''' | vPort1''' |

FIG. 2C

PACKET DISTRIBUTION BASED ON AN IDENTIFIED SERVICE FUNCTION

BACKGROUND

Service functions are those services provided by a provider to process a data packet. These service functions may be performed on the data packet between networking components. As such, these service functions may provide an enhancement to network operations and/or provide additional services.

BRIEF DESCRIPTION OF THE DRAWINGS

In the accompanying drawings, like numerals refer to like components or blocks. The following detailed description references the drawings, wherein:

FIG. 2B is a diagram of example database of a received packet and various modifications to a destination address to correspond to various identified service function instances;

FIG. 2C is a diagram of an example database received packet and various modifications to a destination address and/or source address to correspond to various identified service function paths;

DETAILED DESCRIPTION

Figure 1:
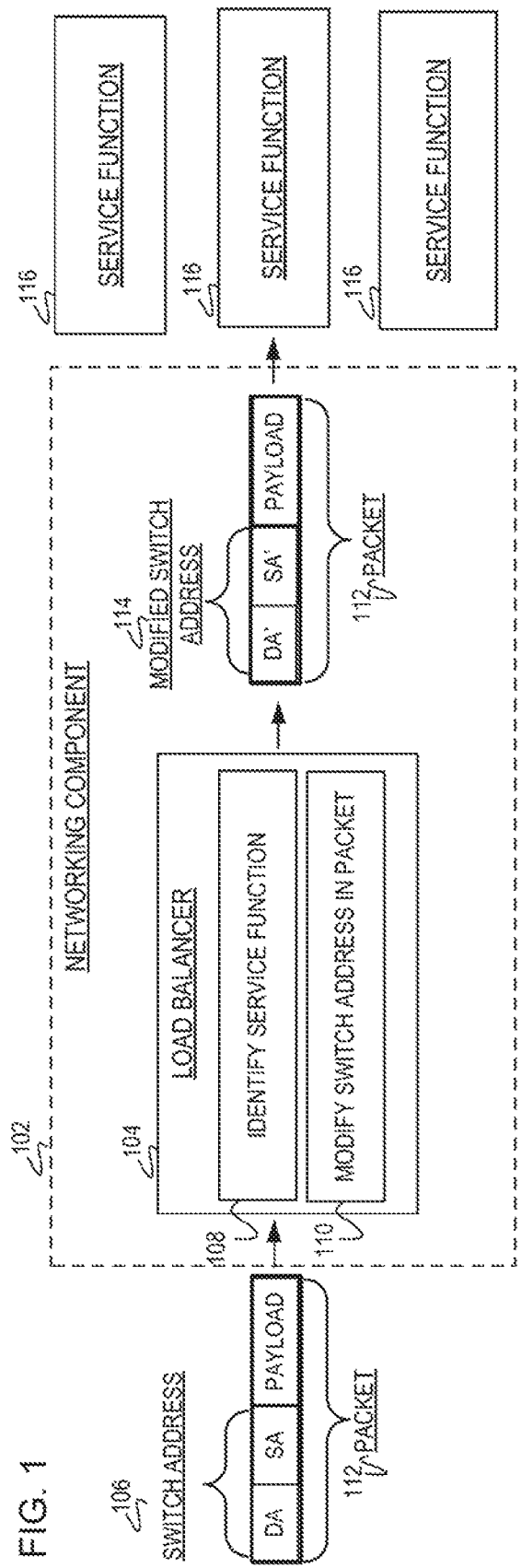
FIG. 1 is a block diagram of an example networking system including a networking component to receive a packet and for a load balancer to identify a service function among service functions to receive the packet.

The service functions are those services, processes, operations, and/or functions which may be administered by a provider to add value to packet transportation and processing. Other service functions may operate as a final destination in a networking system. For example, the service functions may include those services which add value, control quality of service, enhance privacy, and/or provide internal tracking mechanisms. Examples of the service function may include deep, packet inspection (DPI), firewalls, tracking packet sizes, encryption/decryption, latency improvements, improvements in resolving addresses, improvements in transferring information to cover packet losses, network address translation, post-identification inspection, network forwarding policy, layer four-layer seven (L4-L7) switching, multiprotocol label switching (MPLS), virtual local area network (VLAN) switching, meta-data switching, hypertext transfer protocol (HTTP) enhancement, data caching, accounting, parental controls, call blocking, call forwarding, etc. The deployment of these service functions are based on the ability to create a service function path and/or pipeline to instances of these service functions for the traffic to flow through to these service functions. As referred to throughout this document, the term service function instance is the individualized service function while the term service function path includes a series of these service function instances to be performed on a given packet during transportation.

Service functions are implemented using a variety of techniques. One technique is based on a hard wired static network configuration. When using this method changes in the service function locations are very costly since they require physically re-wiring the network. Other methods have been proposed to solve the problems caused by hard wired configurations which use proprietary switching formats, tunneling, packet flow policy switching, etc. This results in a highly complex system and service functions may become incompatible with existing infrastructure within a network. For example, the service function may use newer protocol formats which may be impractical on existing infrastructure. Additionally, a packet may be modified to route to particular service function, but this may cause issues as the more the packet is changed, these changes may affect other networking aspects. For example, modifications to layers three through layers seven (L3-L7) may become complicated because packet modifications may cause further issues down the line in transporting the packet within the network.

Further, if a service function processes a high number of packets, this may create a bottleneck resulting in congestion. If the congestion occurs over a long enough period of time, this may lead to packet loss. Splitting the packet load over redundant service functions may be inefficient as the available capacity of the service functions are not taken into consideration.

To address these issues, some examples disclosed herein provide a mechanism to enable load balancing to across service functions in existing infrastructure. The examples disclose a load balancer to identify a service function among multiple service functions based on a capacity available at each of the service functions. The available capacity is the amount of bandwidth at each service function which is free to perform packet processing. Taking into consideration the available capacity at each service function, the load balancer can efficiently distribute packets to the appropriate service function.

Upon identifying the service function, the load balancer modifies the switch address in the packet to correspond to the identified service function. Modifying the switch address, a networking component distributes the packet to the identified service function. Modifications to the switch address provide compatibility of service function chaining on existing infrastructure. For example, when packets egress from the networking component, these packets with the switch address modifications are considered standard network frames without format change(s). Additionally, modifying the switch address provides the ability to insert and delete service function(s) with ease. This provides an additional level of control over the service function(s) performed on a given packet.

In another example discussed herein, the modified switch address is modified within a layer two (L2) portion of the packet and as such may further include modifying a media access control (MAC) address. Modifying the L2 portion of the packet provides less risk as the modifications to the L2 portion is less likely to affect other networking aspects. Also, modifications to the MAC address enables the compatibility of the service functions on existing infrastructure.

Examples disclosed herein provide a mechanism in which a service function chain may be compatible on existing infrastructure. Additionally, the examples enable a flexibility for routing the packet to a particular service function.

Referring now to the figures, FIG. 1 is a block diagram of an example networking system including a networking component 102 to receive traffic in the form of a packet 112. The packet 112 includes a switch address 106 and a payload. The networking component 102 receives the packet 112 and transmits to a load balancer 104. The load balancer 104 proceeds to identify a service function among multiple service functions 116 at module 108. Upon identifying the service function at module 108, the load balancer 104 proceeds to modify the switch address 106 in the packet 112 at module 110 to produce a modified switch address 114. The modified switch address 114 indicates a location for the networking component 102 to forward the packet 112 accordingly. As such, the modified switch address 114 corresponds to the identified service function. The correspondence allows the networking component 102 to appropriately route the packet 112 to the service function which has the capacity to handle the traffic (e.g., the packet 112) The service functions 116 may include those service functions a networking carrier may wish to perform upon the packet 112 when routing between computer nodes in the networking system. As such, each service function 116 includes a different address indicating the location of where to route the packet 112. In one implementation, the service functions 116 are each a different service function instance. The service function instances are considered an individual service function event which may be performed on the packet 112. In this implementation, the load balancer 104 is located between a service function forwarder (SFF) and each service function instance. Thus when the service function instance is performed, the packet 112 is routed back to the SFF for the appropriate distribution. In another implementation, the service functions 116 each include a different service function path. The service function path are a series of service function instances. In this implementation, the load balancer 104 is located between an ingress classifier (not illustrated) and each of the service function paths in which to distribute the traffic. The networking system as illustrated in FIG. 1 represents a data network in which networked computing devices (e.g., networking components) may exchange traffic (e.g., packets). These networked computing devices establish data connections in the form of networking links between nodes to route and/or forward traffic. Implementations of the networking system include, by way of example, a telecommunications network, Internet, Ethernet, wide area network (WAN), local area network (LAN), optic cable network, virtual network or other type of networking system which passes traffic between nodes.

The networking component 102 is the networked computing device which may establish the data connection with other networking components and/or forward the packet 112 accordingly. As such, the networking component 182 receives the packet 112 and transmits to the load balancer 104. Implementations of the networking component 102 include a multi-port network device, multi-layer switch, media access control (MAC switch, router, virtual switch, virtual controller, or other type of networking component capable of receiving the packet 112 for transmission to other networking components.

The traffic as illustrated with the packet 112, is received by the networking component 102 to identify the switch address 106. In one implementation, an ingress classifier (not illustrated) receives the packet 112 and transmits to the load balancer 104. The load balancer 104 in turn modifies the switch address 106 from the packet 112 to produce the modified switch address 114. Although the traffic is illustrated as a single packet 112, this was done for illustration purposes as the traffic may include multiple packets. As such, the packet 112 is considered a networking packet or data frame which is a formatted unit of data carried by the networking system. For example, the data packet 112 or data frame consists of wire formats for standardizing portions of the packet 112. Accordingly, the packet 112 consists of at least two kinds of data including network control information and user data (i.e., the payload). As such, the control information may further include the switch address 106. The control information provides data for the networking system to deliver the payload to the appropriate destination. For example, the control information may be part of an open systems interconnection (OSI) model and as such may include the data that characterizes and standardizes the internal communication functions by partitioning the network control into various abstract layers, such as layers one through layers seven (L1-L7). This control information may be found within the headers and/or trailers. In this example, the switch address 106 would be considered part of the layer two (L2) portion of the packet 104.

The switch address 106 is a unique identifier assigned within the packet 112 for communications on a physical networking segment. Upon receiving the packet 112 with the switch address 106, the load balancer 104 identifies which of the service functions 116 has the capability of available bandwidth to handle the packet 112. Upon identifying the service function to handle the packet 112, the switch address 106 is changed to the modified switch address 114 to correspond to the identified service function. In one implementation, the switch address 106 is a media access control (MAC) address while in another implementation, the switch address 106 is part of the L2 portion of the packet 112.

The load balancer 104 receives traffic (e.g., packet 112) and in turn determines which service function 116 in which to distribute the traffic. Upon determining which service function 116 to distribute the traffic, the load balancer 104 proceeds to implement the modified switch address 114 to distribute the traffic to the appropriate service function. The load balancer 104 may include a type of load distribution engine and as such implementations may include, electronic circuitry hardware) that implements the functionality of the load balancer 104. In this example, load balancer 104 may include by way of example, an integrated circuit, application integrated circuit (ASIC), controller, virtual controller, processor, semiconductor, processing resource, chipset, semiconductor, or other type of hardware or software implemented component capable of the functionality of the load balancer 104. Alternatively, the load balancer 104 may include instructions (e.g., stored on a machine-readable medium) that, when executed by a hardware component (e.g., processor and/or controller), implements the functionality of the load balancer 104.

At modules 108-110, the networking component 102 uses the switch address 106 to identify which service function to route the traffic based on the available capacity at each of the service functions 116. Identifying the particular service function 116 among the multiple service functions 116 based on the available capacity is a mechanism in which to perform the load balancing of traffic. The networking component 102, namely the load balancer 104, identifies which of the service function(s) 116 to distribute the traffic, accordingly. This decision is based on the available capacity at each of the service functions 116. This available capacity may be determined through various techniques including, but not limited to: the available bandwidth of each of the service functions 116; feedback from each of the service functions 116; reactive by tracking which service function 116 is the least loaded with traffic; predictive by estimating h w much traffic was sent at each of the service functions 116; ordering a number of the service functions 116; performing a weighted distribute on each of the service functions; tracking which service function 116 may be more efficient than other service functions 116; and based on historical performance of each of the service functions 116. Based on the identification of which service function 118 to distribute the traffic, the load balancer 104 modifies the switch address 106 to obtain the modified switch address 114 at module 110. The modified switch address 114 directs the location of the service function 116 for performance. In one implementation of module 110, the networking component 102 utilizes a database to locate identified service function and the corresponding modified switch address 114. The database may include various switch address(es) 106, modified switch address(es) 114, and the corresponding service function(s) 116. In an implementation of module 110, the load balancer 104 modifies a media access control (MAC) address from the switch address 106. In other implementations of module 110, the load balancer 104 modifies a destination address (DA) and/or source address (SA) to achieve the modified destination address (DA') and the modified source address (SA'). The modules 108 and 110 may include, by way of example, instructions (e.g., stored on a machine-readable medium) that, when executed (e.g., by the networking component 102), implement the functionality of modules 108 and 110. Alternatively, or in addition, the modules 108 and 110 may include electronic circuitry (i.e., hardware) that implements the functionality of modules 108 and 110.

The modified switch address 114 represents the address at which the identified service function is located. Thus, the modified switch address 14 provides the location of where to distribute the traffic, accordingly. Upon identifying which service function 116 to distribute the traffic at module 108, the networking component 102 proceeds to identify that address from the database corresponding to the identified service function. As such, the networking component 102 proceeds to transform, the switch address 106 to produce the modified switch address 114. Although the modified switch address 114 includes both the modified destination address (DA') and the modified source address (SA'), this was done for illustration purposes and implementations should not be limited. For example, the modified switch address 114 includes the modified destination address or in addition may also include the modified source address.

The service function(s) 116 are those service function instances or service function paths as provided by the network carrier for processing traffic. Each service function 116 represents a different service function path or different service function instance. Thus, each different service function corresponds to a different modified address. In one implementation each service function 116 is located at a different networking component, while in another implementation, each service function 116 is implemented as a virtual function. Although FIG. 1 illustrates the service function(s) 116 as separate from the networking component 102, this was done for illustration purposes as the service functions 116 may be part of the networking component 102.

Figure 2A:
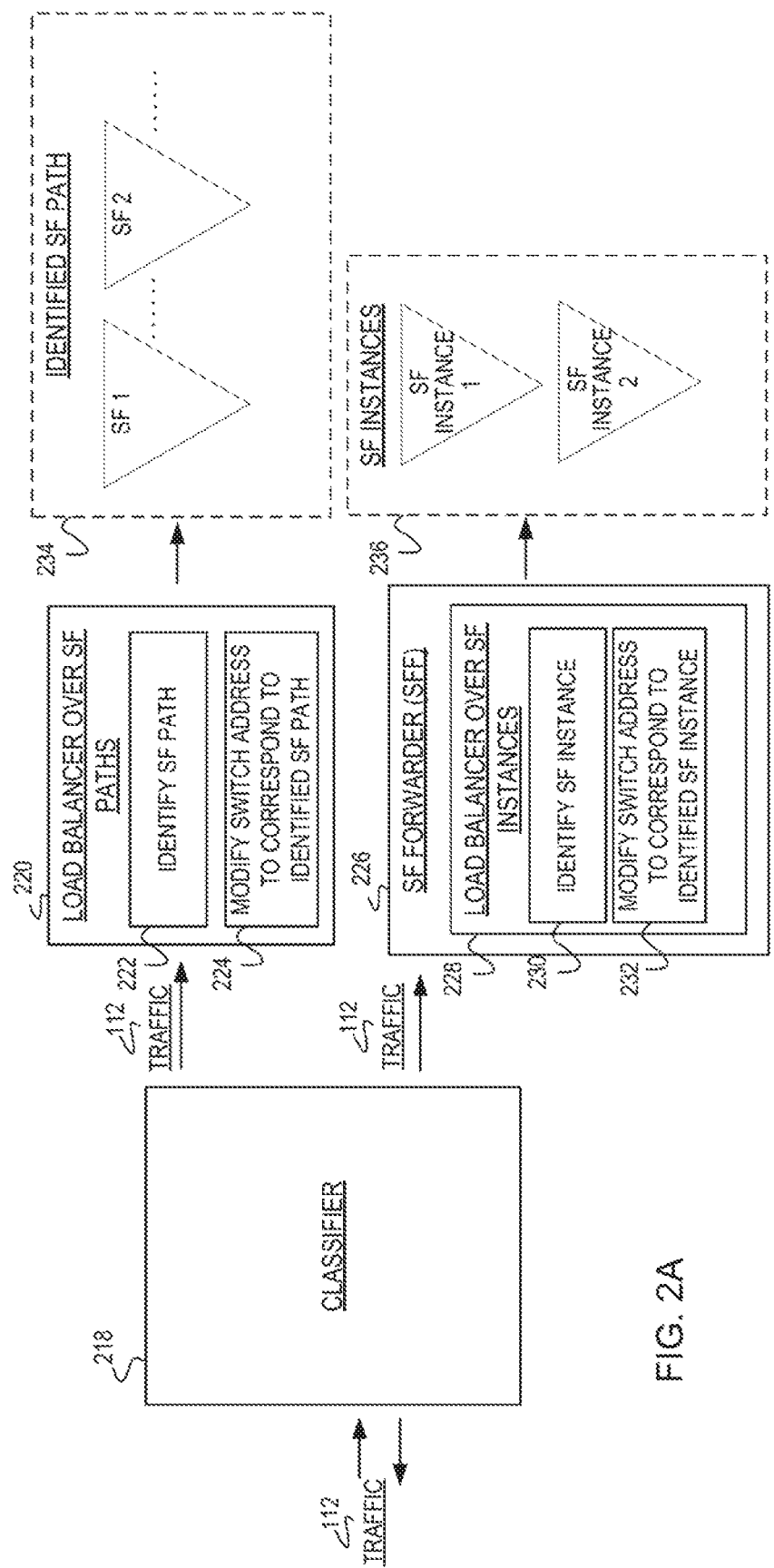
FIG. 2A illustrates an example networking system including various locations of a load balancer for identification of a service function path or identification of a service function instance.

FIG. 2A illustrates an example networking system including various locations of a load balancer 220 and 228 for identification of a service function (SF) path 234 or identification of a service function instance 236. The load balancers 220 and 228 illustrate the various implementations of whether the load balancer 220 or 228 is to distribute the traffic 112 to the identified SF path 234 or the SF instance(s) 236. In the case of the load balancer 220, the traffic 112 may be distributed over a set of service function paths. In the case of the load balancer 228, the traffic 112 may be distributed over a set of SF instances. As explained earlier, the SF path is a series of multiple service function instances while the service function instances are each individual service functions (e.g., DPI, firewall, etc.). Although FIG. 2A illustrates both load balancer cases 220 and 228, this was done for illustration purposes as the networking may also include the situation of either load balancer 220 or 228.

A classifier 218 receives traffic 112 and in turn may transmit the traffic, to either the load balancer over the SF paths 220 or to a service function forwarder (SFF) 226. The classifier 218 forms an initial encapsulation and may set the initial meta-data for each packet in the traffic 112. The route of the traffic 112 to either the load balancer over the SF paths 220 or the load balancer over SF instances 228 may be dependent on which load balancer is implemented in the networking system. For example, if the load balancer of the SF paths 220 is implemented but not the load balancer of SF instances 228, then traffic 112 is routed to the load balancer 220. At modules 222-224 and 230-232, each load balancer 220 and 228 proceeds to identify which SF path or SF instance for traffic distribution based upon the available capacity at each respective SF. Upon identifying the respective SF path or SF instance, the respective load balancer 220 or 228 modifies a switch address in the traffic 112 to correspond to the identified SF path 234 or SF instance 236. The identified SF path 234 is the series of service function instances to process the traffic 112. Upon completion of identified SF path 234, the networking component forwards the traffic 112 to the final destination. The identified SF instance may include one of the SF instances 236 (SF instance 1 or SF instance 2), and as such, the traffic 112 may be routed to one of the SF instances and back to the SFF 226 for forwarding to the final destination.

FIGS. 2B-2C illustrate example databases 238 and 248 to modify a switch address in a packet, accordingly. These databases 238 and 248 may use the networking component to find the switch address for modification to correspond to the identified service function instance or service function path. For example, in the database 238 and 248, the switch addresses 242 and 252, for a single packet may include: DA1 and ChainSegDA1. Each of these switch addresses 242 and 252 illustrate a destination address as provided in the packet. Using the identified service function, the networking component determines a subsequent modified destination address 244 and 254 and also in addition a modified source address 256 and/or egress port 246 and 258. These egress ports 246 and 258 are connected to a virtual machine, virtual network, physical machine, and/or physical network for forwarding the packet(s) to the identified service functions. In further implementations, the databases 238 and 248 may include an entry specifying a direction of the various packets.

FIG. 2B is the database 238 for the load balancer 228 in FIG. 2A to distribute a packet to a set of various service function instances. In this figure, the database 238 includes the received packet from ports 240 (VPort1) and unmodified destination addresses 242 (DA1). Upon identification of the specific service function instance, the load balancer 228 modifies the destination address 242 in the packet to obtain the one of the modified destination addresses 244 (DA1', DA1", and DA1'") which corresponds to the identified service function instance. Each of the modified destination address 244 represent a different service function instance. As such, the various address modifications are represented with a prime (') symbol. In a further implementation, in addition to the destination modification address, the ports 240 are modified to obtain one of the various egress ports 246 (VPort1', VPort1", or VPort1'"). To distribute the packet to one of the various service function instances, the load balancer 228 implements the modified destination address 244 and modified port 246 while a source address may remain unchanged. The modified destination address 244 and modified port 246 each correspond to a different service function instance. For example, the DA1 represents the service function instance which is different from the other service functions in DA" and DA'".

FIG. 2C is the database 248 for the load balancer 220 in FIG. 2A to distribute a packet to a set of various identified service function paths. In this figure, the database 248 includes a received packet with the port 250 (VPort1) and unmodified destination address 252 (ChainSegDA1). Upon identification of the service function path, the load balancer 220 modifies the destination address 252 in the packet to obtain one of the modified destination addresses 254 (ChainSegDA1', ChainSegDA1", and ChainSegDA1'") which corresponds to the identified service function path. In a further implementation, in addition to the modified destination address, the load balancer may proceed to modify the source address 256 (ChainSegSA1', ChainSegSA1", and ChainSegSA1'"). In this implementation, the ports 258 may remain unmodified. The various chain segment destination addresses (ChainSegDA1', ChainSegDA1", and ChainSegDA1'") represent one of the various service functions within each of the representative service function paths.

Figure 3:
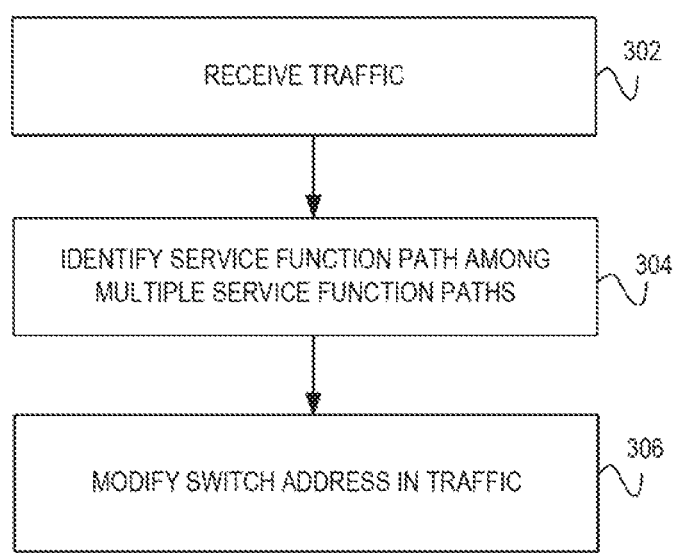
FIG. 3 is a flowchart of an example method executable by a networking device to modify a switch address in traffic used on an identified service function path.

FIG. 3 is a flowchart of a method executable by a networking component to modify a switch address from incoming traffic to distribute the traffic to an identified service function path. The service function path is identified from among multiple function paths based on an amount of available capacity of each of the paths. The amount of available capacity indicates to the networking component the amount of free bandwidth space for processing the traffic. The greater the amount of available capacity, the more traffic that service function path may handle. Initially, the networking component receives traffic in the form of data packet(s). These data packets include the switch address(es) and indicate to the networking device the computational load of the packet so the networking component may identify the appropriate service function path. Upon identifying the service function path, the networking component proceeds to modify the switch address to correspond to the location of the identified service function path. In one implementation, the switch address may be found in the layer two (L2) portion of the packet. As such in this implementation, the packet may be formatted for compliance with IEEE 802® standards. In other implementations the packet is in a format such as an open systems interconnection model (OSI). Upon receiving the packet, the networking component distinguishes the switch address from other information (e.g., computation load of the packet and/or size of the packet, etc.) included in the packet. In discussing FIG. 3, references may be made to the components in FIGS. 1-2 to provide contextual examples. In one implementation, the networking component 102 as in FIG. 1 executes operations 302-306 to perform the load balancing through the identification of the service function chain. Further, although FIG. 3 is described as implemented by the networking component 102 it may be executed on other suitable components. For example, FIG. 3 may be implemented in the form of executable instructions on a machine-readable storage medium 504 and 604 as in FIGS. 5-6.

At operation 302, the networking component receives the traffic, such as the data packet(s). An ingress classifier may operate in conjunction with the networking component to receive the traffic. The traffic includes the switch address and other identifying information.

At operation 304, the networking component identifies the service function path among the other multiple service function paths based on the available capacity of each of the service function paths. The capacity is considered the amount of bandwidth each service function has free to handle additional packet processing. The service function paths are considered those ordered of service function instances which a networking carrier may wish to provide for a particular packet. The size and/or computational load of the traffic may be identified from each packet upon receipt by the networking component. As such, upon receiving traffic (e.g., packet(s)), the networking component identifies which service function path may handle the traffic. In one implementation, upon identifying the service function path that should receive the traffic, the networking component uses a database to identify the switch address corresponding to that service function path. In this implementation, the database lists each service function path and the corresponding switch address in which to modify the packet at operation 306.

At operation 306, the networking component modifies the switch address within the traffic to correspond to the identified service function path. The modified address may be retrieved by the networking component to correspond to the identified service function path. This modified address lists where to forward the packet, accordingly. In implementations, the destination address and/or source address is modified to achieve the location of the identified service function path. In this implementation, the destination address includes the address to the service function path while the source address is the next address where the packet may be forwarded upon completion form the initial service function instance in the chain. Both the destination address and/or source address are modified in the layer two (L2) portion of the packet. Modifying the outer L2 portion of the packet rather than deeper portions of the packet (L2-L7) provides fewer complications in the networking system. In a further implementation, the networking component proceeds to forward the packet to the modified switch address. In this implementation, the networking component, forwards the packet to the modified destination address.

Figure 4:
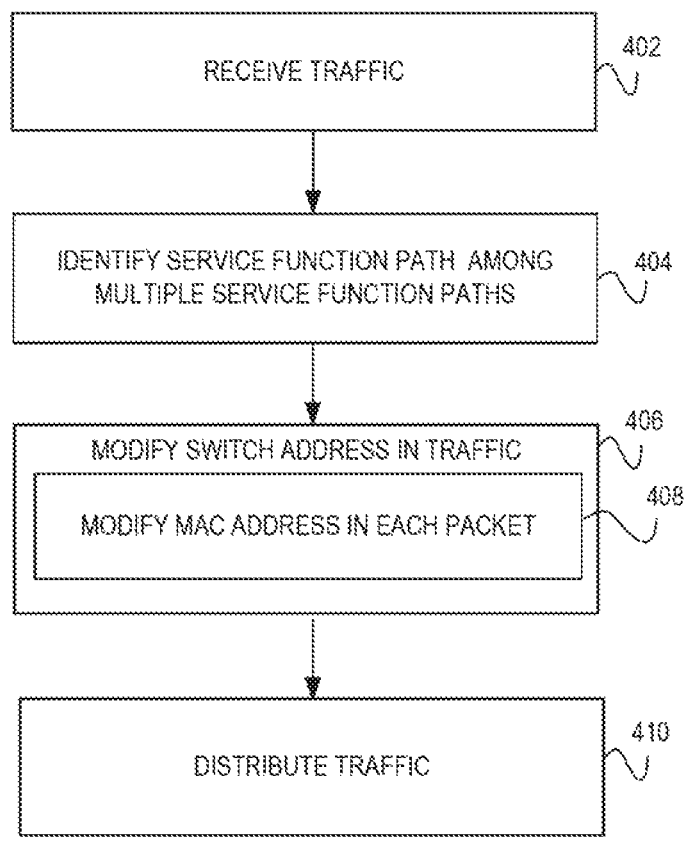
FIG. 4 is a flowchart of an example method executable by a networking device to distribute traffic to an identified service function path through a modification of a media access control (MAC) address in each packet.

FIG. 4 is a flowchart of an example method executable by a networking component to perform load balancing by identifying a service function chain to distribute traffic. The networking component receives the traffic and proceeds to identify which service function path has the available capacity to handle the traffic for processing. Upon identifying the service function path, the networking component modifies a switch address in the traffic. In one implementation, the networking component modifies a MAC address in each packet of the traffic. In discussing FIG. 4, references may be made to the components in FIGS. 1-2 to provide contextual examples. In one implementation, the networking component 102 as in FIG. 1 executes operations 402-410 to perform the load balancing through the identification of the service function chain. Further, although FIG. 4 is described as implemented by the networking component 102 it may be executed on other suitable components. For example, FIG. 4 may be implemented in the form of executable instructions on a machine-readable storage medium 504 and 604 as in FIGS. 5-6.

At operation 402, the networking component receives the traffic in the form of packet(s) which include the switch address and other identifying information, such as the size of the packet and/or computation load of the packet. Operation 402 may be similar in functionality to operation 302.

At operation 404, the networking component identifies the service function path among the multiple service function paths. The service function path is identified based on having the available capacity to handle the incoming traffic. Thus, in this manner, the networking component performs the load balancing by determining where to distribute traffic. Operation 404 may be s in functionality to operation 304 as in FIG. 3.

At operation 408, upon the identification of the particular service function path, the networking component modifies the switch address in the traffic to correspond. The switch address is located in the layer two (L2) portion of the packet(s) and includes a destination address and source address. Thus the modification of the switch address may include modifying the destination address and/or the destination address. In one implementation, the networking component modifies the MAC switch address to correspond to the location of the identified service function path. Operation 406 may be similar in functionality to operation 306 as in FIG. 3.

At operation 408, the networking component modifies the switch address within the traffic. The switch address is modified to the address corresponding to the initial service function instant as part of the part of the service function path. The modified switch address is considered the initial service function instance in the order of the service function path. As such, the networking component may look up the identified service function path from a database and find the corresponding switch address. The networking component uses this corresponding switch address for modification. Accordingly, this modified address directs the networking component on where to forward the packet as to perform the service function path. In one implementation, the networking component modifies the destination, address and/or the source address within layer two (L2) of the packet. In another more specific implementation, the networking component modifies the MAC address in each packet of the traffic. In this implementation, each modified MAC address in each packet corresponds to a different service function path. This enables the networking component to distribute the traffic among the various service function paths with the available bandwidth.

At operation 410 the networking component distributes the traffic in accordance with the modified switch address. The modified switch address corresponds to the identified service function path, so the networking component forwards the traffic to that identified service function path.

Figure 5:
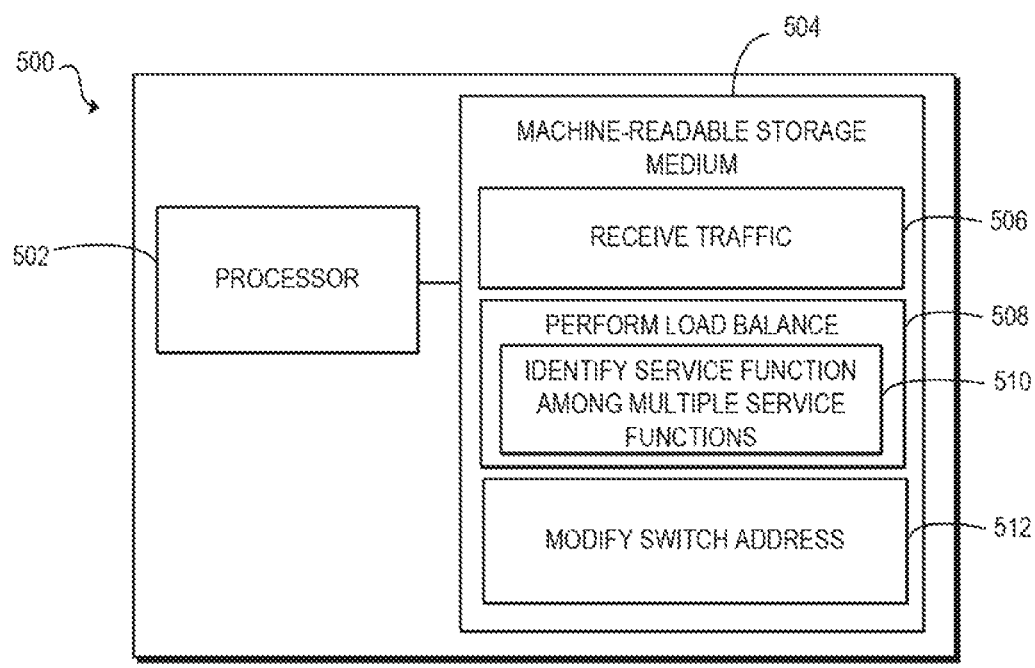
FIG. 5 is a block diagram of an example networking component with a processing resource to execute instructions in a machine-readable storage medium for performing a load balance through an identification of a service function and modifying a switch address to correspond to the identified service function.

FIG. 5 is a block diagram of networking component 500 with processing resource 502 to execute instructions 506-512 within a machine-readable storage medium 504. Specifically, the networking component 500 with the processing resource 502 is to perform load balancing by identifying a service function based on an available capacity of multiple service functions. Upon the identification of the service function, a switch address is modified to correspond to the identified service function for distribution, accordingly. Although the networking component 500 includes processing resource 502 and machine-readable storage medium 504, it may also include other components that would be suitable to one skilled in the art. For example, the networking component 500 may include a load balancer 104 as in FIG. 1. The networking component 500 is an electronic device with the processing resource 502 capable of executing instructions 506-512, and as such embodiments of the networking component 500 include a computing device, server, data center, networking device, client device, switch, router, virtual networking component, or other type of electronic device capable of executing instructions 506-512. The instructions 506-512 may be implemented as methods, functions, operations, and other processes implemented as machine-readable instructions stored on the storage medium 504, which may be non-transitory, such as hardware storage devices (e.g., random access memory (RAM), read only memory (ROM), erasable programmable ROM, electrically erasable ROM, hard drives, and flash memory).

The processing resource 502 may fetch, decode, and execute instructions 506-512 to perform the load balancing of traffic to service functions. Specifically, the processing resource 502 executes instructions 506-512 to: receive traffic; perform load balancing through the identification of the service function among multiple service functions, the identified service function is determined from the capacity and/or available bandwidth; and, modify the switch address within the traffic to correspond to the identified service function; and distribute, the traffic to the identified service function.

The machine-readable storage medium 504 includes instructions 506-512 the processing resource 502 to fetch, decode, and execute. In another embodiment, the machine-readable storage medium 504 may be an electronic, magnetic, optical, memory, storage, flash-drive, or other physical device that contains or stores executable instructions. Thus, the machine-readable storage medium 504 may include, for example, Random Access Memory (RAM), an Electrically Erasable Programmable Read-Only Memory (EEPROM), a storage drive, a memory cache, network storage, a Compact Disc Read Only Memory (CDROM) and the like. As such, the machine-readable storage medium 504 may include an application and/or firmware which can be utilized independently and/or in conjunction with the processing resource 502 to fetch, decode, and/or execute instructions of the machine-readable storage medium 504. The application and/or firmware may be stored on the machine-readable storage medium 504 and/or stored on another location of the networking component 500.

Figure 6:
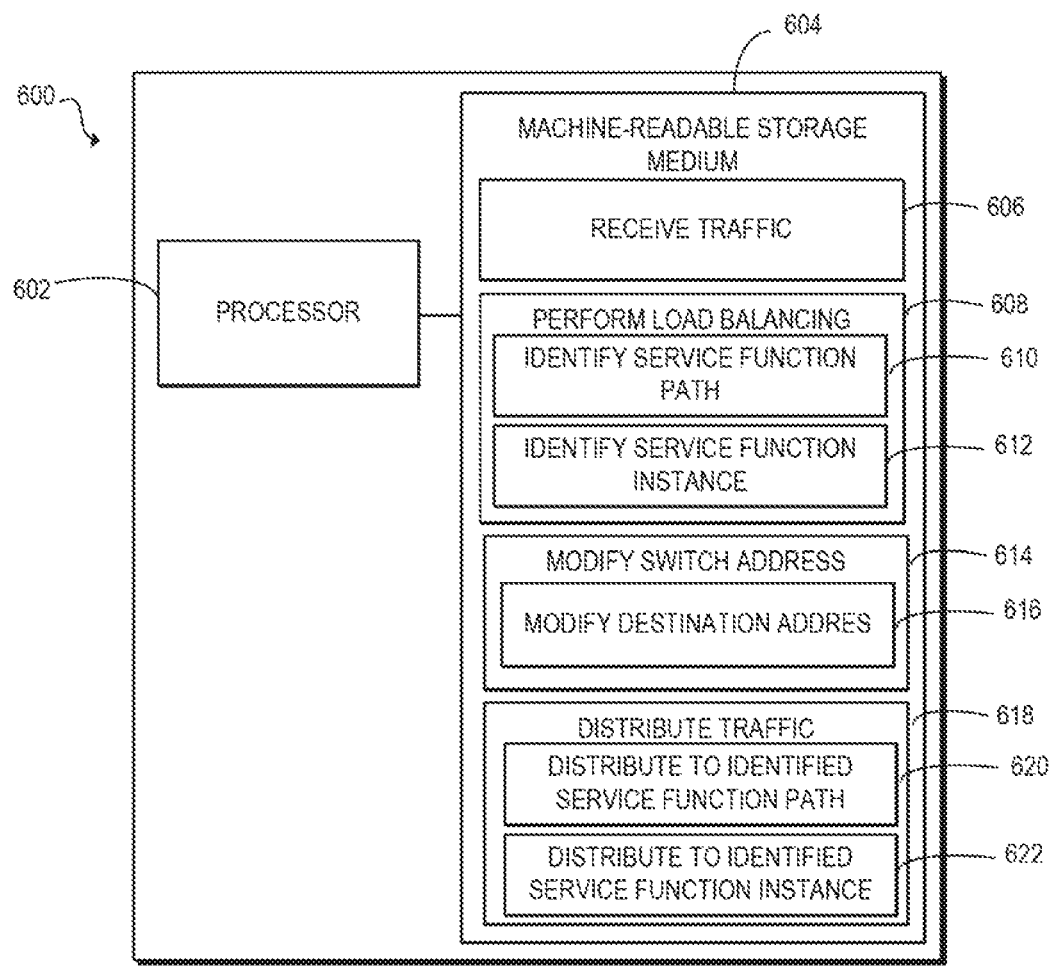
FIG. 6 is a block diagram of an example networking component with a processing resource to execute instructions in a machine-readable storage medium to perform a bad balance through an identification of a service function path or service function instance and modifying a switch address to correspond.

FIG. 6 is a block diagram of networking component 600 with processing resource 602 to execute instructions 606-622 within a machine-readable storage medium 604. Specifically, the networking component 600 with the processing resource 602 is to perform load balancing by identifying a service function path or service function instance based on an available capacity of each of the service functions. The switch address is then modified to correspond to either the identified service function path or service function instance. Upon modification of the switch address, the traffic is distributed to the identified service function path or identified service function instance. Although the networking component 600 includes processing resource 602 and machine-readable storage medium 604, it may also include other components that would be suitable to one skilled in the art. For example, the networking component 600 may include a load balancer 104 as in FIG. 1. The networking component 600 is an electronic device with the processing resource 602 capable of executing instructions 606-622, and as such embodiments of the networking component 600 include a computing device, server, data center, networking device, client device, switch, router, virtual networking component, or other type of electronic device capable of executing instructions 606-622. The instructions 606-622 may be implemented as methods, functions, operations, and other processes implemented as machine-readable instructions stored on the storage medium 604, which may be non-transitory, such as hardware storage devices (e.g., random access memory (RAM), read only memory (ROM), erasable programmable ROM, electrically erasable ROM, hard drives, and flash memory).

The processing resource 602 may fetch, decode, and execute instructions 606-622 to perform the load balancing of traffic to service functions, such as a service function path or a service function instance. Specifically, the processing resource 602 executes instructions 606-622 to: receive traffic; perform load balancing through an identification of the service function path or the service function instance; upon identification of the service function, modify the switch address or specifically, the destination address; and based on the modified address, distribute the traffic to the identified service function path or the identified service function instance.

The machine-readable storage medium 604 includes instructions 606-622 for the processing resource 602 to fetch, decode, and execute. In another embodiment, the machine-readable storage medium 604 may be an electronic, magnetic, optical, memory, storage, flash-drive, or other physical device that contains or stores executable instructions. Thus, the machine-readable storage medium 604 may include, for example, Random Access Memory (RAM), an Electrically Erasable Programmable Read-Only Memory (EEPROM), a storage drive, a memory cache, network storage, a Compact Disc Read Only Memory (CDROM) and the like. As such, the machine-readable storage medium 604 may include an application and/or firmware which can be utilized independently and/or in conjunction with the processing resource 602 to fetch, decode, and/or execute instructions of the machine-readable storage medium 604. The application and/or firmware may be stored on the machine-readable storage medium 604 and/or stored on another location of the networking component 600.

Although certain embodiments have been illustrated and described herein, it will be greatly appreciated by those of ordinary skill in the art that a wide variety of alternate and/or equivalent embodiments or implementations calculated to achieve the same purposes may be substituted for the embodiments shown and described without departing from the scope of this disclosure. Those with skill in the art will readily appreciate that embodiments may be implemented in a variety of ways. This application is intended to cover adaptions or variations of the embodiments discussed herein. Therefore, it is manifestly intended that embodiments be limited only by the claims and equivalents thereof.

We claim:

1. A system comprising:
a load balancer to:
receive a packet comprising a destination address;
identify a service function path from a plurality of service function paths for the packet based on an available capacity of a respective service function path, wherein a service function path indicates a sequence of service functions to be performed on the packet;
determine a service address corresponding to the service function path based on a mapping between the destination address and the service address;
replace the destination address of the packet with the service address; and
forward the packet to the service function path based on the service address.

2. The system of claim 1 wherein the load balancer is further to:
identify, for a second packet, a service function instance from a plurality of service function instances;
determine a second service address corresponding to the service function instance based on a second mapping between a second destination address of the second packet and the second service address; and
replace the second destination address of the second packet with the second service address to forward the second packet to the identified service function instance.

3. The system of claim 1, wherein the destination address is:
a media access control (MAC) address in the packet for distribution.

4. The system of claim 1, wherein, to forward the packet, the load balancer is further to:
determine a port of egress of the packet based on the mapping.

5. The system of claim 1, wherein the load balancer is further to:
determine a next address where the packet to be forwarded upon completion of an initial service function instance in the service function path; and
replace a source address of the packet with the determined next address.

6. The system of claim 1, wherein the mapping maps the destination address to respective service addresses of the plurality of service function paths.

7. The system of claim 1, wherein the load balancer is further to:
order the plurality of service function paths based on weighted distribution; and
identify the service function path from the ordered plurality of service function paths for the packet.

8. A non-transitory machine-readable storage medium comprising instructions that when executed by a processing resource causes a networking component to:
receive a packet comprising a destination address;
identify a service function path from a plurality of service function paths for the packet based on an available capacity of the multiple service function path, wherein a service function path indicates a sequence of service functions to be performed on the packet;
determine a service address corresponding to the service function path based on a mapping between the destination address and the service address;
replace the destination address of the packet with the service address; and forward the packet to the service function path based on the service address.

9. The non-transitory machine-readable storage medium of claim 8, comprising instructions that when executed by the processing resource cause the networking component further to:

determine an egress port for the packet based on the mapping.

10. The non-transitory machine-readable storage medium of claim 8, comprising instructions that when executed by the processing resource causes the networking component further to:
   identify, for a second packet, a service function instance from a plurality of service function instances;
   determine a second service address corresponding to the service function instance based on a second mapping between a second destination address of the second packet and the second service address; and
   replace the second destination address of second packet with the second service address; and
   forward the second packet to the identified service function instance.

11. The non-transitory machine-readable storage medium of claim 8, wherein the destination address is a media access control (MAC) address in the packet.

12. The non-transitory machine-readable storage medium of claim 8, comprising instructions that when executed by the processing resource cause the networking component further to:
   determine a next address where the packet to be forwarded upon completion of an initial service function instance in the service function path; and
   replace a source address of the packet with the determined next address.

13. The non-transitory machine-readable storage medium of claim 8, wherein the mapping maps the destination address to respective service addresses of the plurality of service function paths.

14. The non-transitory machine-readable storage medium of claim 8, comprising instructions that when executed by the processing resource cause the networking component further to:
   order the plurality of service function paths based on weighted distribution; and
   identify the service function path from the ordered plurality of service function paths for the packet.

15. A method executable by a networking component to perform load balancing among a plurality of service function paths, the method comprising:
   receiving; a packet comprising a destination address
   identifying a service function path from the plurality of service function paths for the packet based on an available capacity of a respective service function path, wherein a service function path indicates a sequence of service functions to be performed on the packet;
   determining a service address corresponding to the service function path based on a mapping between the destination address and the service address;
   replacing the destination address of the packet with the service address; and
   forwarding the packet to the service function path based on the service address.

16. The method of claim 15, further comprising:
   determining a port of egress for the packet based on the mapping.

17. The method of claim 15, wherein the destination address is a media access control (MAC) address in the packet.

18. The method of claim 15, further comprising:
   identifying, for a second packet, a service function instance from a plurality of service function instances;
   determining a second service address corresponding to the service function instance based on a second mapping between a second destination address of the second packet and the second service address; and
   replacing the second destination address of the second packet with the second service address to forward the second packet to the identified service function instance.

19. The method of claim 15, further comprising
   determining a next address where the packet to be forwarded upon completion of an initial service function instance in the service function path; and
   replacing a source address of the packet with the determined next address.

20. The method of claim 15, wherein the mapping maps the destination address to respective service addresses of the plurality of service function paths.

* * * * *